United States Patent
Wu et al.

(10) Patent No.: US 10,844,935 B2
(45) Date of Patent: Nov. 24, 2020

(54) ELECTRIC DRIVE SYSTEM WITH A NOVEL DUAL-CLUTCH TRANSMISSION

(71) Applicant: UVic Industry Partnerships Inc., Victoria (CA)

(72) Inventors: Guang Wu, Victoria (CA); Zuomin Dong, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 83 days.

(21) Appl. No.: 14/802,870

(22) Filed: Jul. 17, 2015

(65) Prior Publication Data
US 2016/0017958 A1    Jan. 21, 2016

Related U.S. Application Data

(60) Provisional application No. 62/026,516, filed on Jul. 18, 2014.

(51) Int. Cl.
| | | |
|---|---|---|
| *F16H 3/091* | (2006.01) | |
| *F16H 3/00* | (2006.01) | |
| *B60K 1/00* | (2006.01) | |
| *F16H 3/087* | (2006.01) | |
| *F16H 3/089* | (2006.01) | |
| *B60K 17/02* | (2006.01) | |
| *F16H 3/08* | (2006.01) | |

(52) U.S. Cl.
CPC .............. *F16H 3/091* (2013.01); *B60K 1/00* (2013.01); *F16H 3/006* (2013.01); *F16H 3/087* (2013.01);
(Continued)

(58) Field of Classification Search
CPC .. F16H 3/006; F16H 3/091; F16H 2200/0021; F16H 2200/0039; F16H 3/089;
(Continued)

(56) References Cited

U.S. PATENT DOCUMENTS 4,513,631 A * 4/1985 Koivunen ............... F16H 3/006
74/331
4,823,628 A * 4/1989 Hiraiwa .................. F16H 3/006
74/330

(Continued)

FOREIGN PATENT DOCUMENTS

| EP | 1232890 | 8/2002 |
|---|---|---|
| EP | 1232891 | 8/2002 |
| WO | WO 2012/000705 | 1/2012 |

*Primary Examiner* — Joseph Brown
(74) *Attorney, Agent, or Firm* — Klarquist Sparkman, LLP (57) ABSTRACT

Dual-clutch transmission assemblies for use with electric vehicles include a first shaft having a plurality of input gearwheels mounted thereon. The assembly further includes a second shaft having a plurality of intermediate gearwheels that are freely rotatable with respect to the second shaft and situated to mesh with respective input gearwheels on the first shaft. The assembly also includes a first clutch mounted to the first shaft and a second clutch mounted to the first shaft, the second clutch being spaced apart from the first clutch along a longitudinal axis of the first shaft. The assembly can further include a gear selector disposed on the second shaft to selectively engage at least one of the intermediate gearwheels of the second shaft to lock the at least one intermediate gearwheel to the second shaft such that the at least one intermediate gearwheel co-rotates with the second shaft.

37 Claims, 5 Drawing Sheets

(52) U.S. Cl.
CPC .............. *F16H 3/089* (2013.01); *B60K 17/02* (2013.01); *B60K 2001/001* (2013.01); *F16H 2003/0826* (2013.01); *F16H 2200/0021* (2013.01); *F16H 2200/0039* (2013.01)

(58) Field of Classification Search
CPC ... F16H 2003/0826; F16H 3/087; B60K 1/00; B60K 17/02; B60K 2001/001
USPC .......................................................... 74/330
See application file for complete search history.

(56) References Cited

U.S. PATENT DOCUMENTS

| | | | |
|---|---|---|---|
| 7,028,796 B2 | 4/2006 | Kim | |
| 7,213,666 B2 | 5/2007 | Saito et al. | |
| 7,611,433 B2 * | 11/2009 | Forsyth | F16H 3/006 74/330 |
| 7,845,444 B2 | 12/2010 | Kidokoro et al. | |
| 9,382,974 B2 * | 7/2016 | Kim | F16H 3/006 |
| 2007/0220999 A1 * | 9/2007 | Hatori | F16H 3/006 74/330 |
| 2007/0227282 A1 * | 10/2007 | Forsyth | F16H 3/006 74/330 |
| 2010/0311540 A1 | 12/2010 | Hellenbroich | |
| 2011/0214533 A1 * | 9/2011 | Koyama | B60W 10/02 74/665 A |
| 2012/0216638 A1 * | 8/2012 | Pritchard | F16H 3/006 74/329 |
| 2013/0186233 A1 | 7/2013 | Kaltenbach | |
| 2013/0345008 A1 | 12/2013 | Torrelli | |
| 2013/0345010 A1 * | 12/2013 | Kaltenbach | B60K 6/365 475/5 |

\* cited by examiner

ELECTRIC DRIVE SYSTEM WITH A NOVEL DUAL-CLUTCH TRANSMISSION

CROSS REFERENCE TO RELATED APPLICATION

This application claims the benefit of U.S. Provisional Patent Application No. 62/026,516, filed Jul. 18, 2014, which is incorporated herein by reference in its entirety.

FIELD

The disclosure concerns dual-clutch transmissions for use in drive systems for electric vehicles.

BACKGROUND

Energy efficiency, emissions reduction, performance, as well as purchase and operation costs are critical considerations for personal transportation. Battery electric vehicles (BEVs) and fuel cell electric vehicles (FCEVs) are widely considered promising alternatives to conventional vehicles powered exclusively by internal combustion engines (ICEs). Conventionally, almost all commercially available BEVs and FCEVs are propelled by a single electric motor via a reduction gear. This powertrain architecture relies upon the electric motor to have very wide speed range and high torque capacity to allow acceleration from a standstill, low-speed operation, and high-speed operation (e.g., when driving on highways). In addition, the rotational speed of the electric motor is related to the vehicle speed via a fixed gear ratio, which can compromise powertrain efficiency, and/or require that the electric motor to have high efficiency over a broad speed range. This can result in higher production and operating costs for electric vehicles. Accordingly, improvements to electric vehicle transmissions are desirable.

SUMMARY

Certain embodiments of the disclosure concern a transmission assembly comprising a first shaft including a plurality of input gearwheels mounted thereon, the plurality of input gearwheels including at least one compound gearwheel. The assembly further includes a second shaft having a plurality of intermediate gearwheels, the intermediate gearwheels being freely rotatable with respect to the second shaft and configured to mesh with respective input gearwheels on the first shaft. The assembly further includes a first clutch mounted to the first shaft and configured to selectively input torque to the transmission via the compound gearwheel, and a second clutch mounted to the first shaft and configured to selectively input torque to the transmission via the first shaft, the second clutch being spaced apart from the first clutch along a longitudinal axis of the first shaft. The assembly can further include a gear selector element disposed on the second shaft and configured to selectively engage at least one of the intermediate gearwheels of the second shaft to lock the at least one intermediate gearwheel to the second shaft such that the at least one intermediate gearwheel co-rotates with the second shaft.

In another representative embodiment, a transmission assembly comprises a first shaft including a plurality of input gearwheels idly-mounted thereon, and a second shaft including a plurality of intermediate gearwheels, the plurality of intermediate gearwheels including at least one compound gearwheel that is idly-mounted to the second shaft and configured to mesh with respective input gearwheels on the first shaft. The assembly further includes a first clutch mounted to the first shaft and configured to selectively input torque to the transmission via at least one of the idly-mounted input gearwheels, and a second clutch mounted to the second shaft and configured to selectively input torque to the transmission via the compound gearwheel. The assembly further includes a gear selector element disposed on the first shaft and configured to selectively engage at least one of the idly-mounted input gearwheels of the first shaft to lock the at least one input gearwheel to the first shaft such that the at least one input gearwheel co-rotates with the first shaft.

In another representative embodiment, a transmission assembly comprises a first shaft including at least one input gearwheel mounted thereon, and a second shaft including a plurality of idly-mounted output gearwheels, at least one of the output gearwheels being configured to mesh with the at least one input gearwheel. The assembly further comprises a third shaft including a plurality of intermediate gearwheels mounted thereon, the intermediate gearwheels being configured to mesh with respective output gearwheels. The assembly further comprises a first clutch mounted to the second shaft and configured to selectively input torque from the first shaft into the transmission assembly via the at least one input gearwheel, and a second clutch mounted to the third shaft and configured to selectively engage the third shaft such that rotation of the second shaft induces corresponding rotation of the third shaft. The assembly further comprises a gear selector element disposed on the second shaft and configured to selectively engage at least one idly-mounted output gearwheel of the second shaft to lock the at least one output gearwheel to the second shaft such that the at least one output gearwheel co-rotates with the second shaft. The first clutch can be associated with a torque path through the transmission assembly corresponding to a second gear ratio, and the second clutch can be associated with respective torque paths through the transmission assembly corresponding to a first gear ratio and a third gear ratio.

In another representative embodiment, an electric drive system with a dual-clutch transmission comprises a first shaft including a compound gearwheel having at least two bonded gearwheels, the compound gearwheel being idly-mounted on the first shaft, the first shaft further including at least one idly-mounted input gearwheel. The system further includes a second shaft including a first intermediate gearwheel fixedly mounted on the second shaft, and second and third intermediate gearwheels spaced apart from one another and idly-mounted on the second shaft. The system further includes a first clutch configured to selectively couple the compound gearwheel to the first shaft, and a second clutch configured to couple the first shaft with the second shaft via the at least one input gearwheel and the first intermediate gearwheel. The system further includes a gear selector located between the second and third intermediate gearwheels to selectively engage the second or third intermediate gearwheels such that the engaged intermediate gearwheel co-rotates with the second shaft. The system further includes at least one electric motor coupled to the second shaft, and a drive axle coupled to the first shaft to receive torque from the first shaft via a reduction gearwheel pair that allows the first and second shafts to be parallel or perpendicular to the drive axle.

In another representative embodiment, an electric drive system with a dual-clutch transmission comprises a first shaft configured to receive torque from an electric motor, the first shaft including an input gearwheel fixedly mounted to the first shaft. The system further comprises a second shaft coupled to the first shaft via a first output gearwheel idly-mounted on the second shaft and configured to mesh with the input gearwheel, the second shaft further including second and third output gearwheels idly-mounted to the second shaft with a gear shift element disposed therebetween. The system further comprises a third shaft coupled to the second shaft via a first intermediate gearwheel idly-mounted to the third shaft and configured to mesh with the first output gearwheel on the second shaft, the third shaft further including second and third intermediate gearwheels fixedly mounted to the third shaft and configured to mesh with the second and third output gearwheels of the second shaft. The system further includes a first clutch configured to couple the first output gearwheel to the second shaft such that the first output gearwheel co-rotates with the second shaft when the first clutch is engaged, and a second clutch configured to couple the first intermediate gearwheel to the third shaft such that the first intermediate gearwheel co-rotates with the third shaft when the second clutch is engaged. The system further includes a drive axle coupled to either the second shaft or the third shaft via a reduction gearwheel pair that allows the first, second, and third shafts to be parallel or perpendicular to the drive axle.

In another representative embodiment, a transmission assembly comprises a first shaft (input shaft) including a plurality of idly-mounted gearwheels, the plurality of gearwheels including at least one compound gearwheel. The assembly further includes a second shaft (intermediate shaft) having a plurality of intermediate gearwheels. Two intermediate gearwheels are freely rotatable with respect to the second shaft and configured to mesh with the compound gearwheel on the first shaft, and another intermediate gearwheel is fixedly-mounted on the second shaft and configured to mesh with an idly-mounted gearwheel on the first shaft. The assembly further includes a first clutch mounted to the first shaft and configured to selectively input torque to the compound gearwheel, and a second clutch mounted to the first shaft and configured to selectively input torque to another idly-mounted gearwheel on the first shaft, the second clutch being spaced apart from the first clutch along a longitudinal axis of the first shaft. The assembly can further include a gear selector element disposed on the second shaft and configured to selectively engage at least one of the intermediate gearwheels of the second shaft to lock the at least one intermediate gearwheel to the second shaft such that the at least one intermediate gearwheel co-rotates with the second shaft. The transmission assembly can further include a drive axle coupled to the compound gearwheel via a reduction gearwheel, and need not include a dedicated output shaft.

The embodiments of dual-clutch transmissions and final drives disclosed herein can form one compact unit and deliver torque and speed from an electric motor to the driving wheels of a vehicle. The dual-clutch transmission gearbox can include an input shaft, a parallel intermediate shaft, two clutches, and a set of gearwheels. In some embodiments, two gearwheels, one of which can be a compound gearwheel including two gearwheels bonded to one another, can be idly-mounted on the input shaft. The two clutches can be arranged coaxially on the input shaft to selectively couple the two idly-mounted gearwheels to the input shaft. The two idly-mounted gearwheels can mesh with three gearwheels mounted on the intermediate shaft, two of which can be constantly engaged with the compound gear and can be coupled to the intermediate shaft via a gear selector. In some embodiments, one side of the compound gearwheel can also be coupled to a final drive. As the first clutch is engaged and the second clutch is disengaged, torque can be routed to the intermediate shaft and further to the final drive via the gear selector, compound gearwheel, and engaged gearwheels on the respective shafts. The gear selector can be movable between two positions, which can correspond to a first gear ratio and a third gear ratio corresponding to low speed and high speed, respectively. As the second clutch is engaged and the first clutch is disengaged, torque can be routed to the final drive from the input shaft directly, which can provide a second gear ratio corresponding to medium speed. Thus, the first and third gear ratios can be indirect torque paths through the transmission and the second gear ratio can be a direct torque path.

In some examples, dual-clutch transmissions are provided that can offer multiple variable gear ratios for battery electric vehicles and fuel cell electric vehicles without compromising driver comfort during gearshifts. In other representative examples, dual-clutch transmissions are provided without a separate output shaft for simple structure and compact layout, and that are suitable for front-wheel drive and rear-wheel drive vehicles. According to additional embodiments, dual-clutch transmissions are provided that are suitable for longitudinal or transverse installation in a vehicle.

The foregoing and other objects, features, and advantages of the disclosed embodiments will become more apparent from the following detailed description, which proceeds with reference to the accompanying figures.

DETAILED DESCRIPTION

First Representative Embodiment

The embodiments of dual-clutch transmissions disclosed herein can include simpler structures and offer potentially lower costs than existing conventional transmissions. Referring to the embodiments generally, an input shaft can be fixedly coupled to an electric motor, an output shaft can be fixedly coupled to a drive axle (e.g., a final drive), and an intermediate shaft can be parallel to the input shaft and/or the output shaft and need not be connected to either the electric motor or the drive axle. As used herein, the term "drive axle" refers to an axle including one or more gear assemblies configured to receive torque transmitted by the transmission and deliver it to the driven wheels. In some embodiments, the drive axle may include, for example, a mechanical differential generally indicated at 70 and including a gear assembly 74 (FIG. 1).

A first clutch can provide a first torque path through the transmission assembly from the input shaft to the drive axle corresponding to a second gear ratio for use during medium speed operation. A second clutch, together with a gear selector, can provide additional torque paths through the transmission assembly for additional respective gear ratios. For example, a second torque path can correspond to a first gear ratio equivalent to a first gear of a conventional transmission suitable for low speed operation, while a third torque path provided by the second clutch can provide a third gear ratio corresponding to a third gear of a conventional transmission suitable for higher-speed operation. In some embodiments, one or more of the input shaft, the output shaft, and/or the intermediate shaft may be omitted.

Some of the figures provided herein include an orientation system that includes an x-axis, a y-axis, and a z-axis that are mutually orthogonal to one another. In these figures, the z-axis is oriented perpendicular to the page. It should be understood that the orientation system is merely for reference and can be varied. For example, the x-axis can be switched with the y-axis and/or the transmission assembly can be rotated.

Figure 1:
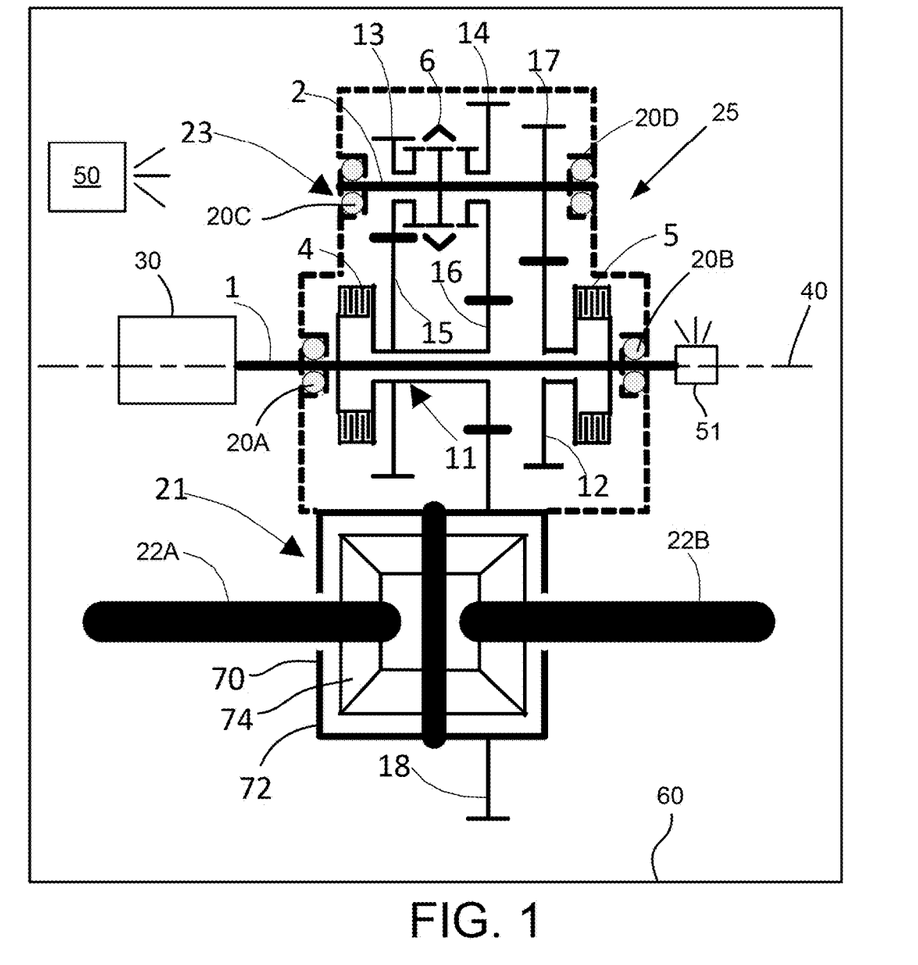
FIG. 1 is a schematic illustration of an embodiment of a transmission assembly situated in a vehicle.
Figure 7:
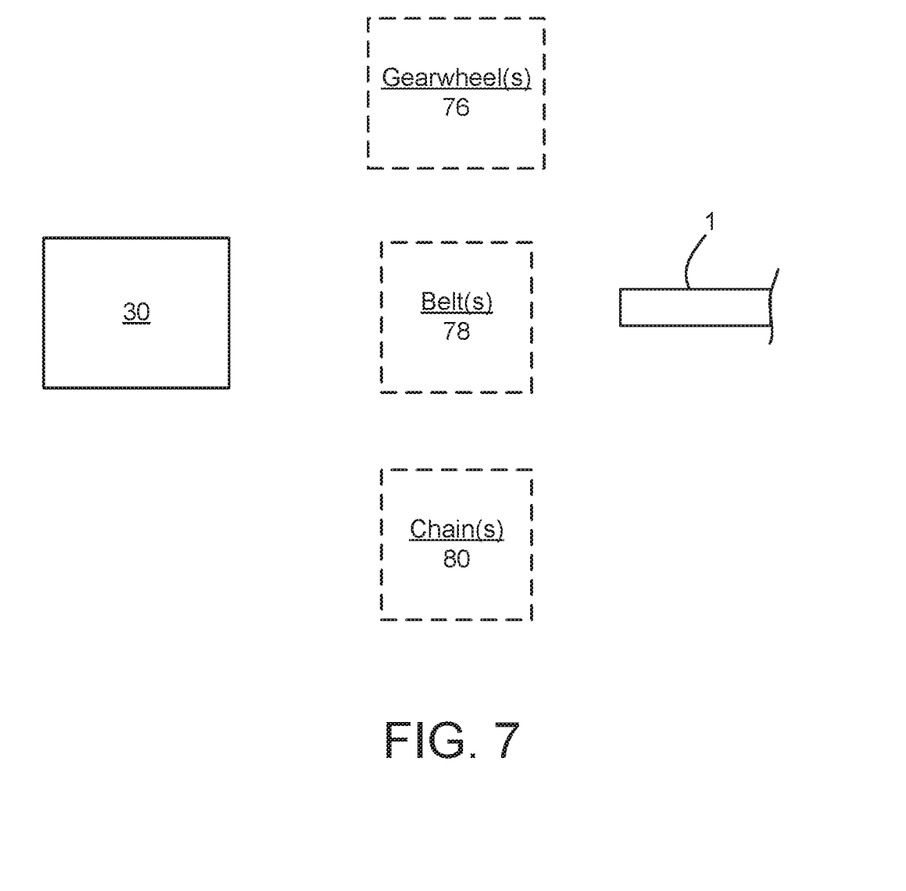
FIG. 7 is a block diagram schematically illustrating an electric motor coupled to a shaft via gearwheels, belts, or chains.

FIG. 1 illustrates a dual-clutch transmission assembly 23 configured for transverse installation in a vehicle 60 (i.e., configured to drive the front wheels of the vehicle 60). The transmission assembly 23 can comprise a gearbox 25 including two shafts, two wet clutches, and a set of gearwheel pairs. An input shaft 1 can be coupled to an electric motor 30 directly (FIG. 1) or via gearwheels 76, belts 78, chains 80, or any combination thereof (FIG. 7). An intermediate shaft 2 can be coupled to the input shaft 1 via a plurality of gearwheel pairs mounted to the respective input and intermediate shafts 1 and 2, namely input gearwheel 13 and intermediate gearwheel 15, input gearwheel 14 and intermediate gearwheel 16, and input gearwheel 17 and intermediate gearwheel 12. The input shaft 1 and the intermediate shaft 2 can also be selectively coupled to one another and to the electric motor 30 using either a first clutch 4 or a second clutch 5. The torque transmission pathway through the respective gearwheel pairs 13 and 15, 14 and 16, and/or 17 and 12 can be selected using a gear selector 6 mounted on the intermediate shaft 2 and located between the input gearwheels 13 and 14. In some embodiments, the gear selector 6 can be configured as a dog clutch.

The input shaft 1 and the intermediate shaft 2 can be rotatably supported by respective bearings 20A-20D. A compound gearwheel 11 can include two bonded intermediate gearwheels 15 and 16, and can be selectively engaged with input shaft 1 via the first clutch 4. As used herein, the term "compound gearwheel" refers to two or more gearwheels that are disposed on a common shaft and that are fixedly coupled to one another such that all gearwheels of the compound gearwheel co-rotate with one another when the compound gearwheel is engaged with the shaft. The intermediate gearwheels 15 and 16 of the compound gearwheel 11 can also be engaged with the two input gearwheels 13 and 14, which can be idly-mounted to the intermediate shaft 2. As used herein, the terms "idly-mounted" and "freely rotatable" refer to a gearwheel or other element disposed on a shaft and which is selectively engageable (e.g., rotationally lockable) with the shaft such that the gearwheel co-rotates with the shaft when engaged with the shaft and does not co-rotate with the shaft when disengaged from the shaft. Such engagement of an idly-mounted gearwheel with a shaft may be effected by, for example, a gear selector, as further described below. Alternatively, gearwheels can be fixedly mounted to a shaft (e.g., using any of various keyed couplings, such as splines) such that rotation of the shaft causes corresponding rotation of the gearwheels along with the shaft.

The input gearwheels 13 and 14 can be selectively engaged with the intermediate shaft 2 via the gear selector 6. The intermediate gearwheel 12 can be idly-mounted to the input shaft 1, and can be coupled to the input shaft 1 via the second clutch 5 and to the intermediate shaft 2 via the input gearwheel 17. A drive axle 21 can be coupled to the compound gearwheel 11 via a gearwheel 18, and torque supplied by the electric motor 30 can be delivered to the driving wheels (not shown) of the vehicle 60 by two half shafts 22A, 22B extending from the drive axle 21. The gearwheel 18 can be coupled to a cage, case, or housing 72 of the drive axle 21, which can be situated around the gear assembly 74, as shown in FIG. 1. In some embodiments, the transmission assembly 23 can include additional accessories such as one or more hydraulic pumps, a parking pawl, etc. In alternative embodiments, the first and/or second clutches 4, 5 can be wet clutches or dry clutches, as desired. As used herein, the term "wet clutch" refers to a clutch that is bathed in a fluid, such as a lubricant. As used herein, the term "dry clutch" refers to a clutch that is not bathed in a fluid.

The first gear ratio can provide a large gear ratio such that it can be suitable for acceleration, slope-climbing and startup at low speed. The second gear ratio can provide a medium gear ratio suitable for medium-speed operate. The third gear ratio can be the smallest gear ratio, and can be used for higher-speed operation, such as highway driving. The three gears ratios can be formed by controlling the positions of the first and second clutches 4, 5, and the position of the gear selector 6, as shown in Table 1. With reference to Table 1, solid circles indicate a determined engagement state for the respective first clutch 4, the second clutch 5, and the gear selector 6. For example, when operating in the first gear ratio, the second clutch 5 is engaged, and the gear selector 6 is engaged with the intermediate gearwheel 13 (i.e., to the left in FIG. 1). With respect to the gear selector 6, hollow circles indicate that the gear selector 6 can be engaged either with the intermediate gearwheel 13 or with the intermediate gearwheel 14 (i.e., located at either left side or the right side in FIG. 1). Thus, when operating in the second gear ratio, the gear selector 6 may be engaged with either the intermediate gearwheel 13 or the intermediate gearwheel 14, as desired.

TABLE 1

| Gear Ratio | Clutch 4 | Clutch 5 | Gear Selector 6 | |
|---|---|---|---|---|
| | | | Left | Right |
| 1 | | • | • | |
| 2 | • | | ○ | ○ |
| 3 | | • | | • |

When the vehicle 60 is stationary, the gear selector 6 can be engaged with the input gearwheel 13. When the vehicle 60 is about to move, the clutch 5 can be engaged while the clutch 4 remains disengaged. Torque from the electric motor 30 is provided to the drive axle 21 via the input shaft 1, the clutch 5, gearwheels 12 and 17, intermediate shaft 2, the gear selector 6, and the gearwheel pairs 13 and 15, and 16 and 18. As the vehicle 60 approaches a speed zone suitable for the second gear ratio, the torque output of the electric motor 30, and the positions of the first and second clutches 4, 5, can be controlled by a controller to enable a relatively constant torque output to the drive axle 21. The torque applied to the first clutch 4 can increase while the torque applied to the second clutch 5 can decrease. As the torque applied to the first clutch 4 increases and the torque applied to the second clutch 5 decreases, both clutches can begin to slip against their respective friction disks. As used herein, the term "friction disk" refers to a frictional coupling between two members, such as shafts, that transmits rotational motion from one member to the other. One or more friction disks may be located on one or both members, as desired. After the second clutch 5 is fully disengaged and the first clutch 4 is fully engaged, the shift from the first gear ratio to the second gear ratio is completed. In the second gear ratio, torque from the electric motor 30 can be delivered to the drive axle 21 via the input shaft 1, the first clutch 4, the compound gear 11, and the gearwheel 18.

Prior to the next upward gearshift from the second gear ratio to the third gear ratio, the gear selector 6 can be moved by an actuator to engage the input gearwheel 14 (on the right side of the gear selector 6 in FIG. 1) to engage the idly-mounted gearwheel 14 with the intermediate shaft 2. The torque provided by the electric motor 30 can then be divided along two paths as the pressures applied to the respective friction disks by the first and second clutches 4, 5 are respectively decreased and increased, with one torque path via the first clutch 4 and another via the second clutch 5. Eventually, the first clutch 4 can be fully disengaged and the second clutch 5 can be fully engaged. The resultant third torque path includes the input shaft 1, the second clutch 5, the gearwheels 12 and 17, the intermediate shaft 2, and gearwheels 14, 16, and 18. In some embodiments, the downshifting process can be similar to the upshift process.

Figure 2:
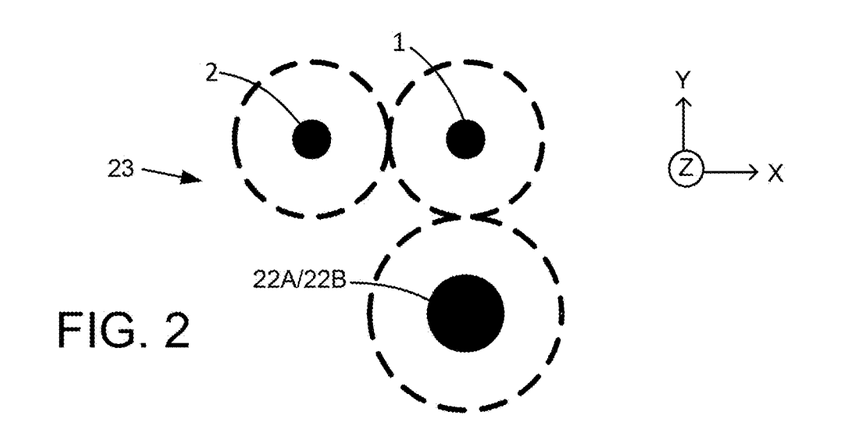
FIG. 2 is a schematic side-elevation view of a cross-section of the transmission assembly of FIG. 1.

In some embodiments, there can be different options for the layout of the input shaft 1 relative to the intermediate shaft 2 and the two half-shafts 22A, 22B. One representative spatial layout is shown in FIG. 2, which illustrates a cross-sectional view of the transmission assembly 23 with the respective shafts 1, 2, 22A, and 22B extending along the z-axis. The first shaft 1 and the intermediate shaft 2 can be spaced apart and substantially coplanar with another along the x-axis. The half-shafts 22A, 22B can be disposed beneath and spaced apart from the input shaft 1 such that the half-shafts 22A, 22B and the input shaft 1 are substantially co-planar with respect to the y-axis. The dashed circles surrounding the respective shafts 1, 2, 22A, and 22B schematically illustrate representative diameters of one or more gearwheels disposed on the respective shafts. The layout illustrated in FIG. 2 can reduce an overall height dimension of the transmission assembly 23. In alternative embodiments, the shafts 1, 2, and 22 can also be arranged, for example, in a co-planar relationship along the x-axis or along the y-axis, as desired.

In some embodiments, the dual-clutch transmission assembly 23 can include a controller 50, various sensors such as sensor 51, and various actuators (not shown) configured to carry out any of the gear-shifting operations described herein. In the embodiment shown, sensor 51 can measure a rotational speed of the input shaft 1. It should be understood that any of the shafts, clutches, and/or gear selectors described herein may include one or more sensors such as sensor 51 to measure any of various parameters relating to the shafts, clutches, and/or gear selectors including rotational speed, direction of rotation, position, torque, temperature, vibration, etc. The controller 50 can include one or more processors and non-volatile memory configured to store computer-executable instructions for causing the one or more processors to perform the various gear-shifting operations and methods disclosed herein. The controller 50 can also be in electrical communication with the various actuators and sensors such as sensor 51 to receive data and/or transmit control signals. Such electrical communication may be implemented wireles sly, such as with one or more radio frequency transceivers, or by wired connections, as desired.

Figure 3:
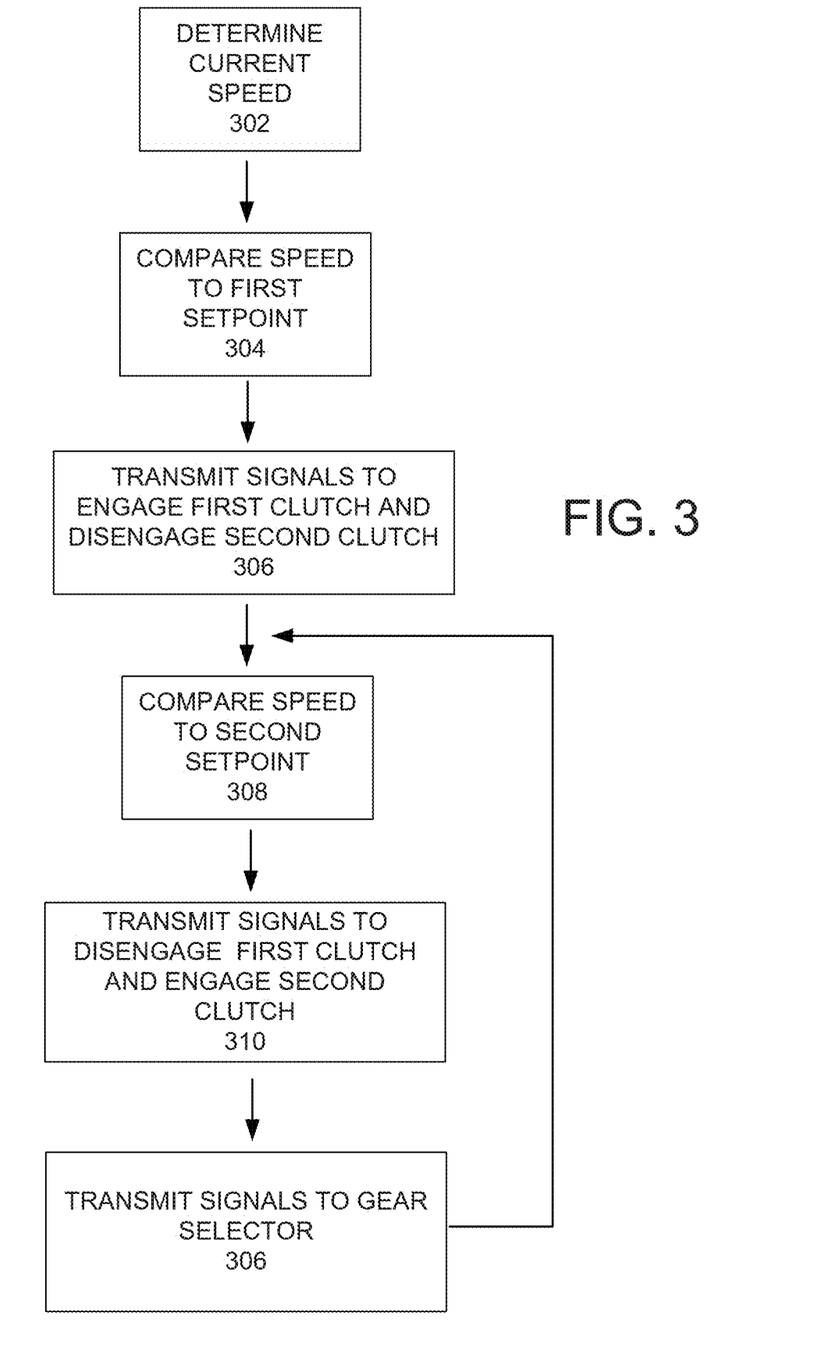
FIG. 3 is a process flow diagram illustrating a method of changing gears.

The process for changing gear ratios during operation can follow principles similar to conventional stepped transmissions by selecting a target gear ratio based on data including vehicle speed, shaft speed, pedal position, etc. FIG. 3 schematically illustrates a representative method for changing from a first gear ratio to a second gear ratio, and from a second gear ratio to a third gear ratio, as described above. At process block 302, a current speed of the vehicle 60 can be determined, such as by measuring a rotational speed of one or more shafts in the transmission assembly with one or more sensors, such as the sensor 51 coupled to the input shaft 1. At process block 304, the current vehicle speed can be compared to a first pre-determined setpoint corresponding to a speed at which the transmission 23 should change from the first gear ratio to the second gear ratio. If the current vehicle speed meets or exceeds the predetermined speed setpoint, the controller 50 transmits control signals at process block 306 causing the first clutch 4 to engage its respective friction disks and the second clutch 5 to disengage from its respective friction disks. At this point, torque can be transmitted through the transmission assembly 23 to the final drive 21 such that the vehicle 60 can operate in the second gear ratio. Then, the controller 50 can transmit control signals causing the gear selector 6 to disengage from the gearwheel 13 and to engage the gearwheel 14, according to feedback signals from sensors such as the sensor 51 and embedded algorithms.

At process block 308, the controller 50 can compare the current vehicle speed to a second pre-determined setpoint corresponding to a speed at which the transmission assembly 23 should change from the second gear ratio to the third gear ratio. If the current vehicle speed meets or exceeds the second predetermined setpoint, the controller 50 transmits control signals at process block 310 causing the first clutch to disengage from its friction disks and the second clutch to engage its friction disks. Torque can then be transmitted through the transmission assembly 23 to the final drive 21 such that the vehicle 60 can operate in the third gear ratio.

Second Representative Embodiment

Figure 4:
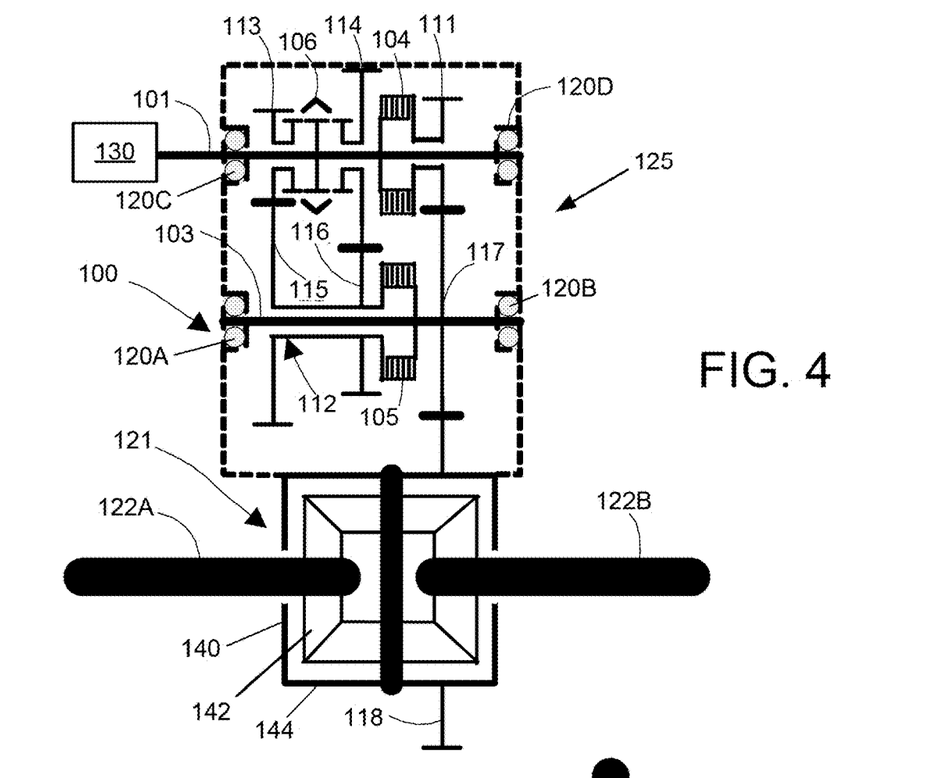
FIG. 4 is a schematic illustration of another embodiment of a transmission assembly.

FIG. 4 illustrates another embodiment of a dual-clutch transmission assembly 100 configured for transverse installation in a vehicle, such as the vehicle 60 of FIG. 1. The transmission assembly 100 can include a gearbox 125 having an input shaft 101, an output shaft 103, a first clutch 104, a second clutch 105, and a plurality of gearwheels. The input shaft 101 can be coupled to an electric motor 130. The output shaft 103 can be coupled to a drive axle 121 via an output gearwheel 117 and a gearwheel 118, which can be fixedly mounted to the output shaft 103 and the drive axle 121, respectively. More particularly, the gearwheel 118 can be coupled to a cage, case, or housing 140 of the drive axle 121. The housing 140 can be situated around a gear assembly 142 of a differential 144 of the drive axle 121. In the embodiment shown, the input shaft 101 and the output shaft 103 can be rotatably supported by four respective bearings 120A-120D. The output shaft 103 can be selectively coupled to the input shaft 101 via the output gearwheel 117 and an input gearwheel 111 idly-mounted to the input shaft 101. When engaged, the first clutch 104 can couple the input gearwheel 111 to the input shaft 101 such that the input gearwheel 111 co-rotates with the input shaft 101.

The second clutch 105 can couple the output shaft 103 to a compound gearwheel 112 including two gearwheels 115 and 116. The compound gearwheel 112 can be idly-mounted to the output shaft 103, and can mesh with two idly-mounted input gearwheels 113 and 114 on the input shaft 101. The input gearwheels 113 and 114 can be selectively engaged with a gear selector 106 mounted on the input shaft 101 between the respective input gearwheels 113 and 114. Torque supplied by the electric motor 130 can be delivered to the driving wheels (not shown) by two half-shafts 122A, 122B coupled to the drive axle 121.

In some embodiments, the transmission assembly 100 can include additional features such as one or more hydraulic pumps, a parking pawl, etc. The transmission assembly 100 can also include a controller similar to the controller 50 described above with respect to the embodiment of FIG. 1, and a plurality of actuators configured to move the respective elements of the transmission assembly 100 when shifting gears. In some embodiments, the transmission 100 can include substantially the same gear ratios as described above with respect to the embodiment of FIG. 1.

Third Representative Embodiment

Figure 5:
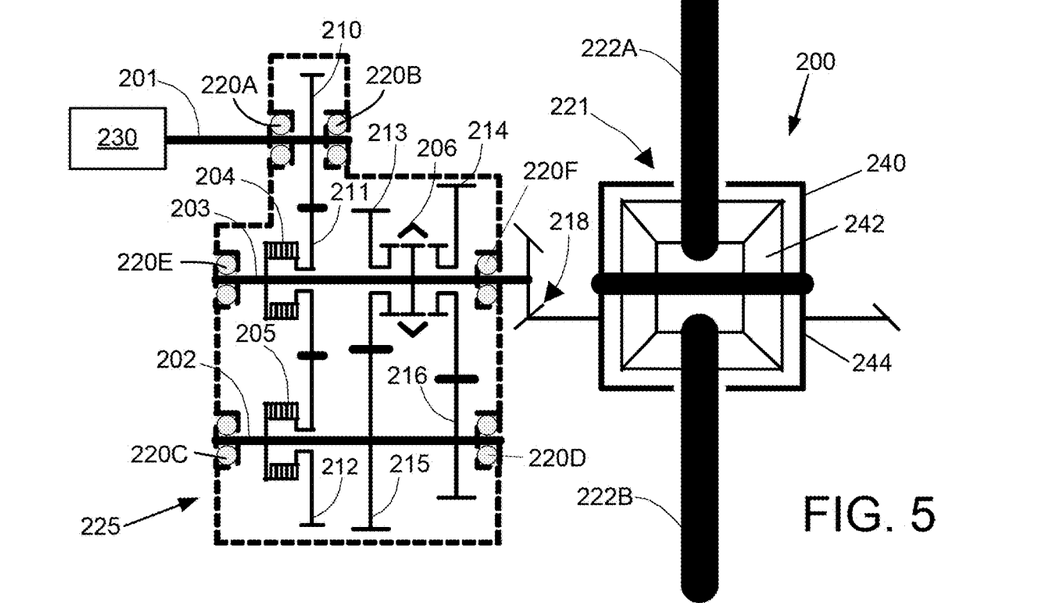
FIG. 5 is a schematic illustration of another embodiment of a transmission assembly.

FIG. 5 illustrates another embodiment of a dual-clutch transmission assembly 200 configured for longitudinal installation in a vehicle (i.e., configured to drive the rear wheels of a rear-wheel drive vehicle), such as the vehicle 60 of FIG. 1. The transmission assembly 200 can include a gearbox 225 having an input shaft 201, an intermediate shaft 202, an output shaft 203, a first clutch 204, a second clutch 205, and a plurality of gearwheels. The input shaft 201 can be coupled to an electric motor 230, and the output shaft 203 can be coupled to one or more reduction gearwheels, generally indicated at 218. In some embodiments, the reduction gearwheels 218 can be bevel gearwheels. In the embodiment shown, the intermediate shaft 202 is parallel to the input and output shafts 201, 203, and can be coupled to output shaft 203 via a set of enmeshed gearwheel pairs, namely output gearwheel 211 and intermediate gearwheel 212, output gearwheel 213 and intermediate gearwheel 215, and output gearwheel 214 and intermediate gearwheel 216. In the embodiment shown, the output gearwheels 211, 213, and 214 can be idly-mounted to the output shaft 203. In the embodiment shown, the intermediate gearwheels 215 and 216 can be fixedly mounted to the intermediate shaft 202, and the intermediate gearwheel 212 can be idly-mounted to the intermediate shaft 202.

Torque can be inputted to the transmission 200 via the first clutch 204 and/or second clutch 205. The first clutch 204 can selectively couple the input shaft 201 with the output shaft 203 via an input gearwheel 210 fixedly mounted to the input shaft 201 and the output gearwheel 211 idly-mounted to the output shaft 203. The output shaft 203 can also be selectively coupled to the intermediate shaft 202 via the second clutch 205, the output gearwheel 211, and the intermediate gearwheel 212. The intermediate gearwheels 215 and 216 of the intermediate shaft 202 can also engage with the output gearwheels 213 and 214 of the output shaft 203.

The transmission assembly 200 can further include a gear selector 206, which can be mounted on the output shaft 203 between the output gearwheels 213 and 214 and can be configured to selectively engage the output gearwheels 213 or 214 to lock the respective gearwheels to the output shaft 203. The input shaft 201, the intermediate shaft 202, and the output shaft 203 can be rotatably supported by bearings 220A and 220B, 220C and 220D, and 220E and 220F, respectively. In some embodiments, the transmission assembly 200 need not include a compound gearwheel. In other embodiments, the transmission 200 can include a controller similar to the controller 50, and may include additional features such as one or more hydraulic pumps, one or more actuators, a parking pawl, etc.

When traveling at low speed, the second clutch 205 can be locked (i.e., engaged) and the gear selector 206 can be engaged with the output gearwheel 214 (to the right in FIG. 5) such that torque is delivered to a drive axle 221 (i.e., a final drive). This can correspond to a first gear ratio. The gearwheel 218 can be coupled to a cage, case, or housing 240 of the drive axle 221. The housing 240 can be situated around a gear assembly 242 of a differential 244 of the drive axle 221. When traveling at medium speed, the first clutch 204 can be locked (i.e., engaged), and torque from the input shaft 201 can be delivered to the drive axle 221 via the reduction bevel gearwheels 218, which can correspond to a second gear ratio. At high speed, the first clutch 204 can be disengaged and the second clutch 205 can be re-engaged, and the gear selector 206 can move to engage the output gearwheel 213 (to left in FIG. 5). This can correspond to a third gear ratio.

Figure 6:
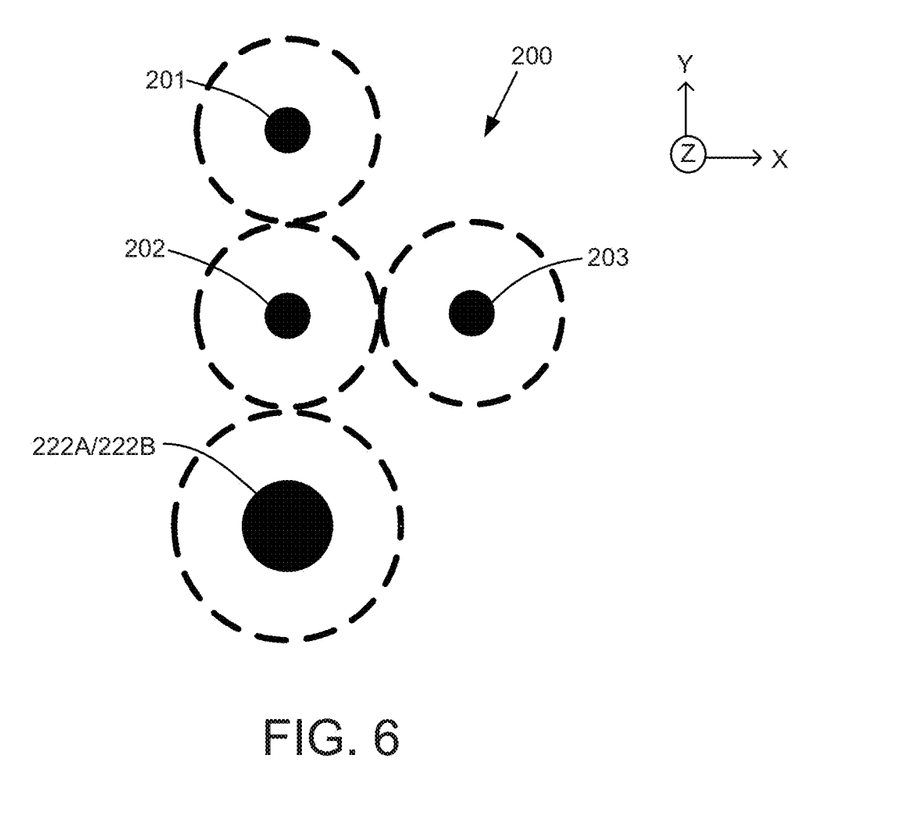
FIG. 6 is a schematic side-elevation view of a cross-section of the transmission assembly of FIG. 5.

As with the embodiments described above, there can be different options for the layout of the input shaft 201, the intermediate shaft 202, the output shaft 203, and the two half-shafts 222A, 222B relative to one another. One representative spatial layout is shown in FIG. 6, which illustrates a cross-sectional view of the transmission assembly 200 with the respective shafts 201, 202, 203, 222A, and 222B extending along the z-axis. The input shaft 201, the intermediate shaft 203, and the half-shafts 222A, 222B can be spaced apart and substantially coplanar with one another along the y-axis. In some embodiments, the intermediate shaft 202 and the output shaft 203 can be spaced apart and substantially co-planar with one another along the x-axis. The dashed circles surrounding the respective shafts 201, 202, 203, 222A, and 222B schematically illustrate representative diameters of one or more gearwheels disposed on the respective shafts. In alternative embodiments, the shafts 201, 202, 203, 222A, and 222B can also be arranged in, for example, a co-planar relationship with respect to the x- or y-axes, as desired.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims. We therefore claim as all that comes within the scope and spirit of these claims.

What is claimed is:

1. A transmission assembly, comprising:
   a first shaft including a first plurality of gearwheels mounted thereon, the first plurality of gearwheels including a first gearwheel and a second gearwheel coupled together to form a compound gearwheel idly-mounted to the first shaft;
   a second shaft including a second plurality of gearwheels situated to mesh with the first plurality of gearwheels on the first shaft, at least one of the gearwheels of the second shaft being idly-mounted to the second shaft;
   a first clutch mounted to the first shaft and configured to selectively engage the compound gearwheel with the first shaft, the first clutch being a friction clutch comprising a plurality of friction disks;
   a second clutch mounted to the first shaft on the opposite side of the compound gearwheel from the first clutch, the second clutch being a friction clutch comprising a plurality of friction disks;
   a gear selector disposed on the second shaft and configured to selectively engage the at least one gearwheel of the second shaft to lock the at least one gearwheel of the second shaft to the second shaft such that the at least one gearwheel of the second shaft co-rotates with the second shaft; and
   a drive axle including a drive axle housing and a gearwheel directly coupled to the drive axle housing, the gearwheel of the drive axle housing being directly meshed with one of the plurality of gearwheels mounted to the first shaft;
   wherein a first gear ratio and a third gear ratio are produced by routing torque through the second clutch and the gear selector, and a second gear ratio is produced by routing torque through the first clutch.

2. The transmission assembly of claim 1, wherein the compound gearwheel is meshed with the gearwheel of the drive axle housing.

3. The transmission assembly of claim 1, wherein:
   the second clutch is spaced apart from the first clutch along a longitudinal axis of the first shaft and is configured to selectively engage a third gearwheel idly-mounted to the first shaft to lock the third gearwheel to the first shaft.

4. An electric vehicle or fuel cell electric vehicle including the transmission assembly of claim 1.

5. The transmission assembly of claim 1, wherein the first shaft is coupled to an electric motor directly or via gearwheels, belts, chains, or any combination thereof.

6. The transmission assembly of claim 1, wherein the transmission assembly is configured for transverse installation in a vehicle.

7. The transmission assembly of claim 1, wherein an electric motor is coupled to the first shaft, and the drive axle is positioned beneath the first shaft.

8. The transmission assembly of claim 7, wherein the electric motor is coupled to the first shaft via gearwheels, belts, chains, or any combination thereof.

9. The transmission assembly of claim 1, wherein the first and second shafts are parallel to and coplanar with each other.

10. The transmission assembly of claim 1, further comprising a controller in electrical communication with the first clutch and the gear selector to control a respective position of the first clutch and the gear selector.

11. The transmission assembly of claim 10, further comprising one or more sensors to sense parameters associated with the transmission assembly including rotational speed, direction of rotation, position, torque, temperature, vibration, or combinations thereof, the one or more sensors being in electrical communication with the controller.

12. The transmission assembly of claim 1, wherein the gear selector is a dog clutch.

13. The transmission assembly of claim 1, wherein:
   the at least one gearwheel of the second shaft is a first gearwheel of the second shaft;
   the second shaft further comprises a second gearwheel idly-mounted to the second shaft; and
   the gear selector is configured to selectively engage the first gearwheel of the second shaft or the second gearwheel of the second shaft to lock the engaged gearwheel to the second shaft such that the engaged gearwheel co-rotates with the second shaft.

14. The transmission assembly of claim 1, wherein the drive axle includes two half-shafts extending from the drive axle.

15. The transmission assembly of claim 1, wherein the drive axle includes a differential.

16. The transmission assembly of claim 1, wherein at least one friction disk of the plurality of friction disks of the first clutch is directly coupled to the first shaft, and at least one friction disk of the plurality of friction disks of the first clutch is coupled to the compound gear wheel.

17. The transmission assembly of claim 1, wherein:
   two half shafts extend from the drive axle housing parallel to a first axis;
   the first shaft and the second shaft extend parallel to the first axis; and
   the drive axle housing and the two half shafts are offset from the first and second shafts along a second axis that is perpendicular to the first axis such that the drive axle housing and the two half shafts are disposed beneath the first shaft.

18. A transmission assembly, comprising:
a first shaft including a plurality of gearwheels mounted thereon, the plurality of gearwheels including a first gearwheel and a second gearwheel coupled together to form a compound gearwheel idly-mounted to the first shaft;
a second shaft including a plurality of the plurality of gearwheels situated to mesh with gearwheels on the first shaft, at least one of the gearwheels of the second shaft being idly-mounted to the second shaft;
a first clutch mounted to the first shaft and configured to selectively engage the compound gearwheel with the first shaft to input torque to the transmission via the compound gearwheel, the first clutch being a friction clutch comprising a plurality of friction disks;
a second clutch mounted to the first shaft on the opposite side of the compound gearwheel from the first clutch, the second clutch being a friction clutch comprising a plurality of friction disks;
a gear selector element disposed on the second shaft and configured to selectively engage the at least one gearwheel of the second shaft to lock the at least one gearwheel of the second shaft to the second shaft such that the at least one gearwheel of the second shaft co-rotates with the second shaft; and
a drive axle including a drive axle housing and a gearwheel directly coupled to the drive axle housing, the gearwheel of the drive axle housing being directly meshed with the compound gearwheel;
wherein a first gear ratio and a third gear ratio are produced by routing torque through the second clutch and the gear selector element, and a second gear ratio is produced by routing torque through the first clutch.

19. The transmission assembly of claim 18, wherein the first shaft further includes a third gearwheel idly-mounted on the first shaft, and the second clutch is configured to selectively engage the third gearwheel to lock the third gearwheel to the first shaft.

20. An electric vehicle or fuel cell electric vehicle including the transmission assembly of claim 18.

21. An electric drive system, comprising:
a first shaft including a first gearwheel and a second gearwheel coupled to each other to form a compound gearwheel, the compound gearwheel being idly-mounted on the first shaft, the first shaft further including a third gearwheel;
a second shaft including a fourth gearwheel mounted on the second shaft, and fifth and sixth gearwheels spaced apart from one another and idly-mounted on the second shaft, the fifth and sixth gearwheels of the second shaft being directly meshed with the compound gearwheel of the first shaft;
a first clutch mounted on the first shaft and configured to selectively engage the compound gearwheel with the first shaft, the first clutch being a friction clutch comprising a plurality of friction disks;
a second clutch coupled to the first shaft on the opposite side of the compound gearwheel from the first clutch, the second clutch being a friction clutch comprising a plurality of friction disks;
a shifting element located between the fifth and sixth gearwheels on the second shaft and configured to selectively engage the fifth gearwheel or the sixth gearwheel such that the engaged gearwheel co-rotates with the second shaft; and
a drive axle coupled to the first shaft to receive torque from the first shaft, the drive axle including a drive axle housing and a gearwheel directly coupled to the drive axle housing, the gearwheel of the drive axle housing being directly meshed with one of the gearwheels mounted to the first shaft;
wherein a first gear ratio and a third gear ratio are produced by routing torque through the second clutch and the shifting element, and a second gear ratio is produced by routing torque through the first clutch.

22. The system of claim 21, wherein the system provides three gear ratios for a vehicle moving in a forward direction.

23. The system of claim 21, wherein the first and second shafts are supported by respective bearings.

24. The system of claim 21, wherein the compound gearwheel on the first shaft and the fifth and sixth gearwheels on the second shaft form two respective gearwheel pairs between the first and second shafts.

25. The system of claim 21, wherein an electric motor is coupled to the first shaft via gearwheels, belts, chains, or any combination thereof.

26. The system of claim 21, wherein an electric motor is directly coupled to the first shaft.

27. The system of claim 21, wherein the electric drive system is configured for transverse installation in a vehicle.

28. The system of claim 21, wherein the second clutch together with the shifting element in a first position is associated with the first gear ratio and the second clutch with the shifting element in a second position is associated with the third gear ratio.

29. The system of claim 21, wherein the shifting element is a dog clutch.

30. The system of claim 21, wherein the gearwheel of the drive axle housing is directly meshed with the compound gearwheel.

31. The transmission assembly of claim 13, wherein the first gearwheel of the second shaft and the second gearwheel of the second shaft are meshed with the compound gearwheel.

32. The transmission assembly of claim 31, wherein:
the first shaft further comprises a third gearwheel idly-mounted to the first shaft;
the second shaft further comprises a third gearwheel fixedly-mounted to the second shaft; and
the third gearwheel of the first shaft is meshed with the third gearwheel of the second shaft.

33. The system of claim 21, wherein:
the third gearwheel is idly-mounted to the first shaft; and
the second clutch is configured to engage the third gearwheel with the first shaft.

34. The system of claim 21, wherein the drive axle includes two half-shafts extending from the drive axle.

35. The system of claim 21, wherein the drive axle includes a differential.

36. The electric drive system of claim 21, wherein at least one friction disk of the plurality of friction disks of the first clutch is directly coupled to the first shaft, and at least one friction disk of the plurality of friction disks of the first clutch is coupled to the compound gear wheel.

37. A transmission assembly, comprising:
a first shaft including a plurality of gearwheels mounted thereon, the plurality of gearwheels including a first gearwheel and a second gearwheel coupled to each other to form a compound gearwheel idly-mounted to the first shaft, the plurality of gearwheels further including a third gearwheel idly-mounted to the first shaft;

a second shaft including a plurality of gearwheels situated to mesh with gearwheels on the first shaft, at least one of the gearwheels of the second shaft being idly-mounted to the second shaft;

a first clutch mounted to the first shaft and configured to selectively engage the compound gearwheel with the first shaft to input torque to the compound gearwheel directly via the first shaft, the first clutch being a friction clutch comprising a plurality of friction disks;

a second clutch mounted to the first shaft to selectively engage the third gearwheel with the first shaft to input torque to the compound gearwheel via the third gearwheel of the first shaft and the at least one gearwheel on the second shaft, the second clutch being spaced apart from the first clutch along a longitudinal axis of the first shaft, the second clutch being a friction clutch comprising a plurality of friction disks;

a gear selector disposed on the second shaft and configured to selectively engage the at least one gearwheel of the second shaft to lock the at least one gearwheel of the second shaft to the second shaft such that the at least one gearwheel of the second shaft co-rotates with the second shaft; and a drive axle including a drive axle housing and a gearwheel directly coupled to the drive axle housing, the gearwheel of the drive axle housing being directly meshed with one of the plurality of gearwheels mounted to the first shaft;

wherein a first gear ratio and a third gear ratio are produced by routing torque through the second clutch and the gear selector, and a second gear ratio is produced by routing torque through the first clutch.

* * * * *